United States Patent [19]

Royle

[11] Patent Number: 4,502,510

[45] Date of Patent: Mar. 5, 1985

[54] AUTOMATIC CLEANING AND METERING DEVICE

[75] Inventor: Stephen D. Royle, Bloomington, Minn.

[73] Assignee: Dana Corporation, Toledo, Ohio

[21] Appl. No.: 466,276

[22] Filed: Feb. 9, 1983

[51] Int. Cl.³ ............................................. F15D 1/02
[52] U.S. Cl. ........................................ 138/45; 138/46
[58] Field of Search ............................ 138/40, 45, 46; 251/118; 137/540

[56] References Cited

U.S. PATENT DOCUMENTS

| | | | |
|---|---|---|---|
| 1,813,122 | 7/1931 | Moore | 138/45 X |
| 2,829,674 | 4/1958 | Segelhorst et al. | 138/45 |
| 3,164,141 | 1/1965 | Jones | 138/45 X |
| 3,165,097 | 1/1965 | Lowther | 138/45 X |
| 3,282,323 | 11/1966 | Katz et al. | 138/45 X |
| 3,431,944 | 3/1969 | Sakuma | 138/45 |
| 3,837,362 | 9/1974 | Barnes | 138/45 |
| 3,951,379 | 4/1976 | Cornelius | 138/45 X |
| 4,075,294 | 2/1978 | Saito et al. | 138/45 X |
| 4,383,550 | 5/1983 | Sotokazu | 138/45 X |

Primary Examiner—James E. Bryant, III
Attorney, Agent, or Firm—Robert M. Leonardi; Norbert A. Heban

[57] ABSTRACT

A fluid system is disclosed having a passage with a reduced diameter orifice. A wire extends into the orifice and is reciprocated therein to simultaneously clean and meter a predetermined fluid flow through the orifice. Automatic reciprocating movement of the wire is accomplished by differential pressures acting on the wire on opposite sides of the orifice.

15 Claims, 6 Drawing Figures

AUTOMATIC CLEANING AND METERING DEVICE

BACKGROUND OF THE INVENTION

This invention relates to restrictors in general and is particularly directed to a reciprocating restrictor for use in a fluid pressure system in which the restrictor is operated automatically by fluid pressure in the system.

Conventional restrictors for fluid pressure systems comprise a wire located in an orifice to reduce the size of the orifice and thereby regulate fluid flow through the orifice. It is common practice to selectively reciprocate the wire within the orifice to keep the orifice free from contaminants while maintaining a predetermined flow of fluid through the orifice. This eliminates the need for filters and screens to prevent contaminants from plugging the orifice in such systems.

Automatic reciprocating movement of the wire in such systems has been accomplished by attaching the wire to a piston which, under changing fluid pressures, imparts an automatic reciprocating movement to the wire. In these arrangements, the piston is spring loaded in one direction and pressure operated in the opposite direction. Pressure is used to move the piston and fixed wire against the biasing force of the spring.

While these devices operate satisfactorily in some fluid systems, they are complex, requiring a plurality of parts and much more space than presently available in other fluid systems.

SUMMARY OF THE INVENTION

The present invention is a restrictor for a fluid pressure system comprising a wire movable through a restricting orifice formed in a fluid passage. Variable pressures existing on opposite sides of the orifice cause reciprocating movement of the wire relative to the orifice. Preferably, the wire is formed as an integral part of a coil spring. The restrictor of the present invention is simple, compact and easily adapted to fit in a conventional fluid system with little or no modification.

DESCRIPTION OF THE PREFERRED EMBODIMENTS

Figure 1:
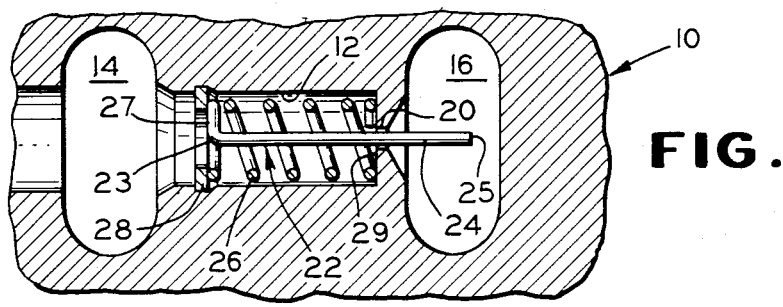
FIG. 1 is a partial cross-sectional view of a fluid pressure device utilizing the restrictor of the present invention.

Referring to FIG. 1, a portion of a fluid pressure system housing is shown generally at 10 including a fluid passage 12 and first and second pressure chamber 14 and 16 respectively located on opposite sides of fluid passage 12. Pressure chambers 14 and 16 are designed to be connected to suitable pressure supply and exhaust lines, respectively, of the fluid pressure system to control operation of various components.

Fluid passage 12 has one end open for communicating with pressure chamber 14 and the other end open by a reduced diameter orifice 20 for communicating with pressure chamber 16. Thus, fluid passage 12 serves as a constantly open leakage path for connecting pressure chambers 14 and 16. Fluid flow is metered between chambers 14 and 16 and controlled by a restrictor 22 located in fluid passage 12 and extending through orifice 20. Restrictor 22 includes an axially extending wire 24 which has a constant diameter throughout its length projects centrally through reduced diameter orifice 20 and has two axially spaced end portions 23 and 25. End portion 23 is exposed to pressure in chamber 14 while end portion 25 constitutes a metering end and is exposed to pressure in chamber 16. Wire end portion 23 is part of a light coiled compression spring 26 and is connected to spring 26 by a radially extending arm 27. Spaced abutments are provided in fluid passage 12 for locating spring 26 and thereby the restrictor 22. In a preferred embodiment, one abutment comprises a snap ring 28 seated in a suitable groove provided at the open end of fluid passage 12 while the other abutment comprises a wall 29 provided at the orifice end of passage 12. Snap ring 28 and wall 29 serve as seats for the opposite ends of spring 26 and thus function to resiliently position and maintain wire 24 within reduced orifice 20. When spring 26 is in its fully expanded position, or free state, the wire 24 projects a predetermined distance into chamber 16 so that it will never become displaced from orifice 20.

In the preferred embodiment, the coils of spring 26 are integrally connected to wire 24 by the radially extending arm 27. Arm 27 is constructed as an integral extension of one of the spring end coils and projects toward the spring center. The wire 24 is bent at a right angle to arm 27 to extend axially through the center of spring 26. The length of the wire 24 is selected so that its free or metering end 25 will always be a substantial distance beyond orifice 20, i.e., the wire will never be fully removed from the orifice 20 during any phase of operation.

It will be apparent from the foregoing description that varying the coil diameter of spring 26 will result in different loads being applied to wire 24. In the preferred embodiment, the installed load of spring 26 is just enough to insure a relatively small preload of about 0.11 (eleven hundreths) pounds nominal.

The preload is maintained at a minimum to insure movements of the spring wire 24 during any significant operating condition. It will be understood that the movement of wire 24 is maximized by minimizing the spring rate of spring 26. For example, the pressure differential required to start movement of wire 24 is:

$$(PB - PA) = \frac{\text{Spring Preload}}{(\text{Area})}$$

Where:
PS is the pressure in chamber 14
PA is the pressure in chamber 16
Area is the cross-sectioned area of wire 24

Figure 2:
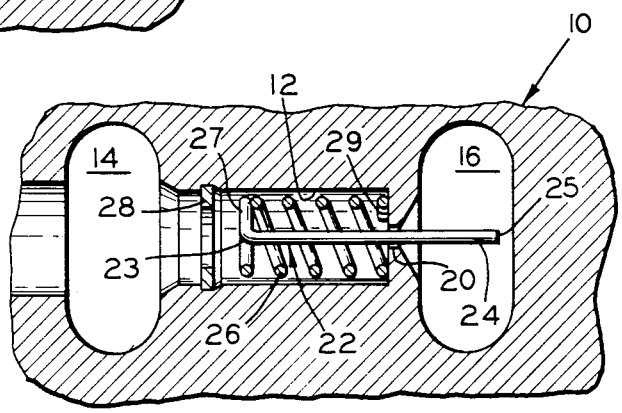
FIG. 2 is a view of the device of FIG. 1 with the fluid pressure device in another operative position.

FIG. 2 shows the device at some pressure differential sufficient to cause movement of wire 24. The axial movement of wire 24 can be calculated as follows:

$$\text{Distance} = \frac{(PB - PA)(\text{Area})}{\text{Spring Rate}}$$

The cross sectional area of the wire and the spring rate can be established so that normal system operation results in pressure differential fluctuations sufficient to cause reciprocal movement of wire 24 within orifice 20. This movement tends to move particles too large to fit easily between the wire 24 and orifice 20 away from orifice 20.

Accordingly, with repect to FIGS. 1 and 2, it will be seen that when pressure in chamber 14 is higher than pressure in chamber 16, there is a net force applied to spring end 23 pushing wire 24 toward orifice 20. When this force overcomes the installed load of spring 26, wire 24 moves relative to orifice 20. As the pressure differential between chambers 14 and 16 change the forces applied to opposed ends 23 and 25 also change causing wire 24 to move in and out of orifice 20 but, under no circumstance, will it ever be fully retracted therefrom.

Referring to FIG. 1, in the normally static position, spring 26 is compressed between snap ring 28 and housing wall 29 so that wire 24 projects through the center of reduced diameter orifice 20 with its free end 32 extending a predetermined distance into chamber 16. In this position the outer cylindrical surface of wire 24 comprises a fluid engaging surface which is exposed to any fluid flowing between chambers 14 and 16 through passage 12. While the preload applied to spring 26 normally urges the left (as seen in FIG. 1) of spring 26 against snap ring 28, as pressure in chamber 14 increases, the fluid flow through passage 12 also increases. When the pressure in chamber 14 is decreased the load of spring 26 responds to push wire 24 back toward its original position. Accordingly, as the pressure differential between chambers 14 and 16 changes, wire 24 moves within orifice 20 to reduce the sensitivity of plugging due to contamination. Because wire 24 is constantly maintained within orifice 20 during such operation, it will constantly clean and simultaneously maintain the desired fluid flow through the orifice.

Thus, it will be apparent that, in operation, when pressure in chamber 14 is higher than the pressure chamber 16, there is a net force pushing wire 24 toward reduced diameter orifice 20. When this force overcomes the installed load of spring 26, wire 24 moves relative to reduced diameter orifice 20. As the pressure differential between chambers 14 and 16 changes, wire 24 moves back-and-forth within reduced diameter orifice 20 to keep it free from contaminants that may tend to clog the reduced diameter orifice 20 while simultaneously maintaining a predetermined fluid flow through the orifice.

Figure 3:
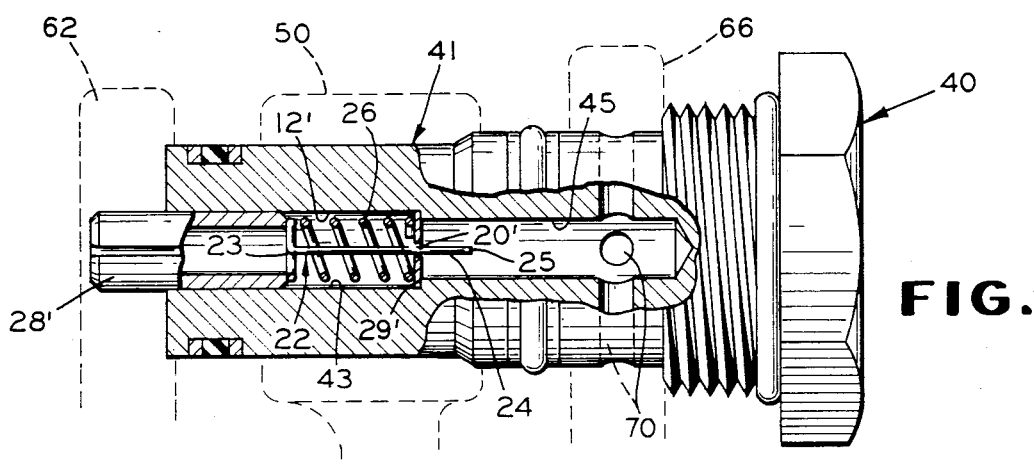
FIG. 3 is a partial cross-sectional view of a cartridge employing the present invention.
Figure 4:
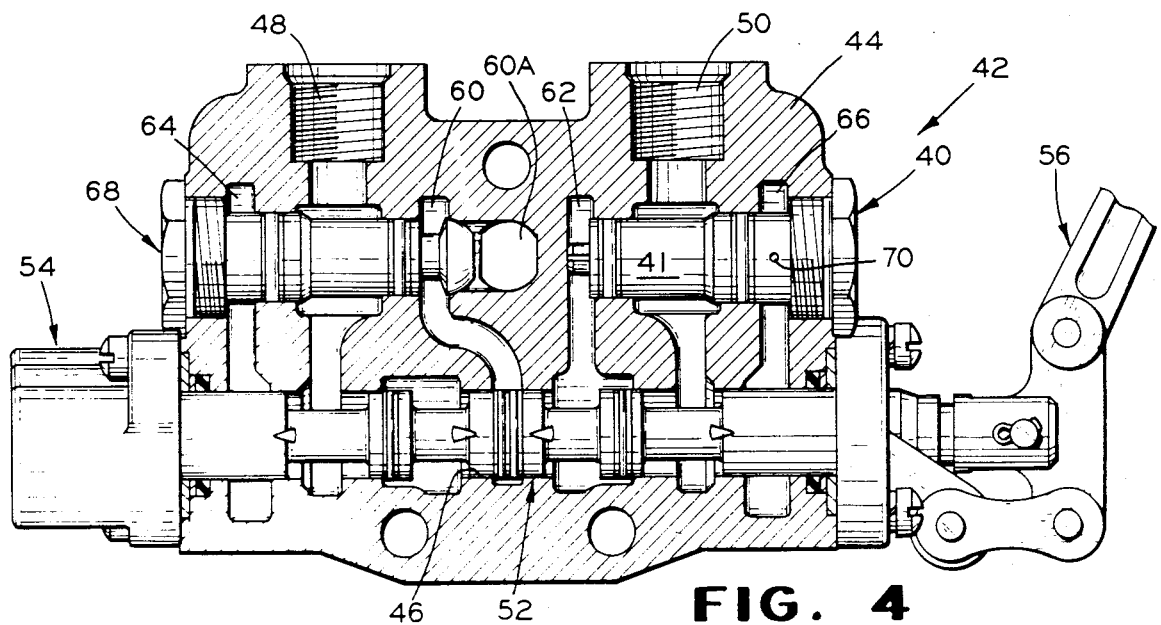
FIG. 4 is a partial cross-sectional view of a typical hydraulic control valve in which the cartridge of FIG. 2 is utilized.

Illustrated in FIG. 3 is a cartridge 40 employing the principles of restrictor 22 shown in FIGS. 1 and 2. Cartridge 40 may be used in a directional control valve 42 such as shown in FIG. 4. The directional control valve 42 is a conventional manually operable valve mechanism designed to control extension and retraction of a cylinder, to control a reversible hydraulic motor, or to sequence other circuit operations.

Briefly, control valve 42 comprises a valve body 44 including an axially extending bore 46, a pair of control ports 48 and 50 and suitable inlet and exhaust ducts for connecting control ports 48 and 50 to a pressure supply (not shown) or to an exhaust (not shown) in a well known manner. A standard 4-way, 3-position spool valve 52 is slidably received in bore 46. Spool valve 52 is spring-centered to a neutral position by a centering device 54 connected to one end of spool valve 52 and manually actuated to its various operative positions by a lever operating means 56 connected to the other spool valve end. Suitable lands and grooves are formed in spool valve 52 to selectively connect control ports 48 and 50 to inlet ports 60 and 62 or exhaust ports 64 and 66 in a manner well known to those skilled in the art.

A conventional load check valve assembly 68 is disposed in control port 48 between ports 60 and 60A. Check valve assembly 68 prevents a raised load from dropping when system pressure in port 60 is too low to raise load in control ports 48 or 50 and spool 52 is stroked to try to raise the load on control ports 48 or 50.

Referring specifically to FIG. 3, it will be seen that the cartridge 40 is installed through control port 50 between respective inlet and exhaust ports 62 and 66. The purpose of cartridge 40 is to protect inlet port 62 from overpressurization by diverting fluid from inlet port 62 to exhaust port 66 in response to excessive pressure in inlet port 62. Cartridge 40 has a cylindrical stem portion 41 extending between inlet and exhaust ports 62 and 66 respectively. A central fluid passage 12' is provided in stem portion 41 comprising an outer cylindrical bore 43 and an inner reduced diameter bore 45. Outer bore 43 opens into inlet passage 62 while inner bore 45 communicates with exhaust port 66 by means of a plurality of radially extending cross bores 70. In this embodiment, fluid flow is metered between ports 62 and 66 and controlled by restrictor 22 located in fluid passage 12'. Restrictor 22 is identical in structure and operation to that shown in FIGS. 1 and 2. The coiled portion of spring 26 is located in passage 12' between a split C-shaped sleeve 28' frictionally fit in the outer end of bore 43 and a washer 29' seated against a shoulder formed by inner reduced diameter bore 45. Washer 29' has a reduced diameter orifice 20' which is equivalent to orifice 20 of FIGS. 1 and 2. In this embodiment, the spaced abutments provided in passage 12' include the inner end of split sleeve 28' and opposed inner surface of washer 29'. These abutments correspond to snap ring 28 and wall 29 respectively of FIGS. 1 and 2. Accordingly, as in the embodiment of FIGS. 1 and 2, in its assembled position spring 26 is preloaded between sleeve 28' and washer 29' and wire 24 extends through the center of reducer diameter orifice 20' formed in washer 29'. The length of wire 24 is such that its free end 25 extends a predetermined distance into bore 45 so that it will never be fully retracted from orifice 20' during the various stages of operation. Further, in this embodiment, inlet port 62 is equivalent to chamber 14 and exhaust port equivalent to chamber 16 of FIGS. 1 and 2. Thus, when pressure in port 62 is higher than the pressure in port 66, there is a net force applied to wire end 23 pushing wire 24 toward orifice 20'. As the pressure differential between ports 62 and 66 change, the forces applied to opposed ends 23 and 25 also change thereby causing wire 24 to move in and out of orifice 20' but never being fully retracted therefor.

In environments where the fluid system is subjected to fiber of lint type contaminants, it may be necessary to modify the structure to prevent such contaminants from adhering to the free end of the restrictor. Alternate embodiments overcoming such a problem are disclosed in FIGS. 5 and 6.

Figure 5:
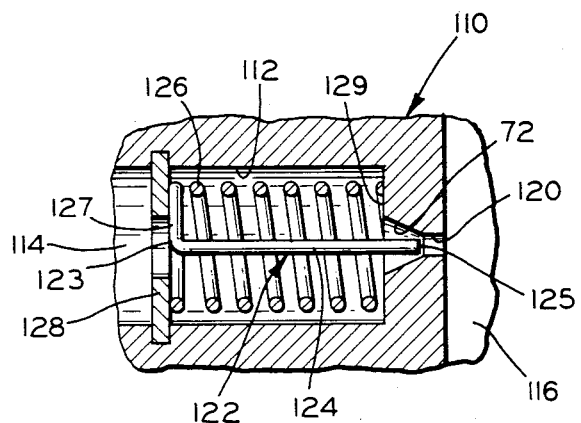
FIG. 5 is a partial cross-sectional view showing another embodiment of the present invention.

Referring to FIG. 5, a portion of a fluid pressure system housing is shown generally at 110 including first and second pressure chambers 114 and 116 respectively located on opposite sides of a fluid passage 112.

Fluid passage 112 has one end open for communicating with pressure chamber 114 and an enlarged diameter tapered hole 72 blending into a reduced diameter orifice 120 for communicating with pressure chamber 116. Fluid flow is controlled and metered between chambers 114 and 116 by a restrictor 112 located in fluid passage 112. In this instance, restrictor 122 includes an axially extending wire 124 which, at rest, projects centrally into tapered opening 72 but is spaced a short distance from entry into reduced diameter orifice 120. As in the previous embodiment, axially extending wire 124 has two axially spaced end portions 123 and 125 with end portion 123 integrally connected to a light coiled compression spring 126 by a radially extending arm 127. Spaced abutments in the form of a snap ring 128 and end wall 129 resiliently positioned spring 126 in fluid passage 112.

In this embodiment, when pressure in chamber 114 is higher than pressure in chamber 116, spring 126 is compressed causing metering end 125 of wire 124 to move through reduced diameter orifice 120 toward chamber 116. As the pressure differential between chambers 114 and 116 changes, spring 126 expands thereby moving wire 124 in the opposite direction pulling metering ends 125 out of reduced diameter orifice 120 and back to its original position. As end 125 of wire 124 retracts into tapered hole 72 any fiber or lint type contaminants will be flushed freely through the large diameter tapered hole 72 and out reduced diameter orfice 120.

Figure 6:
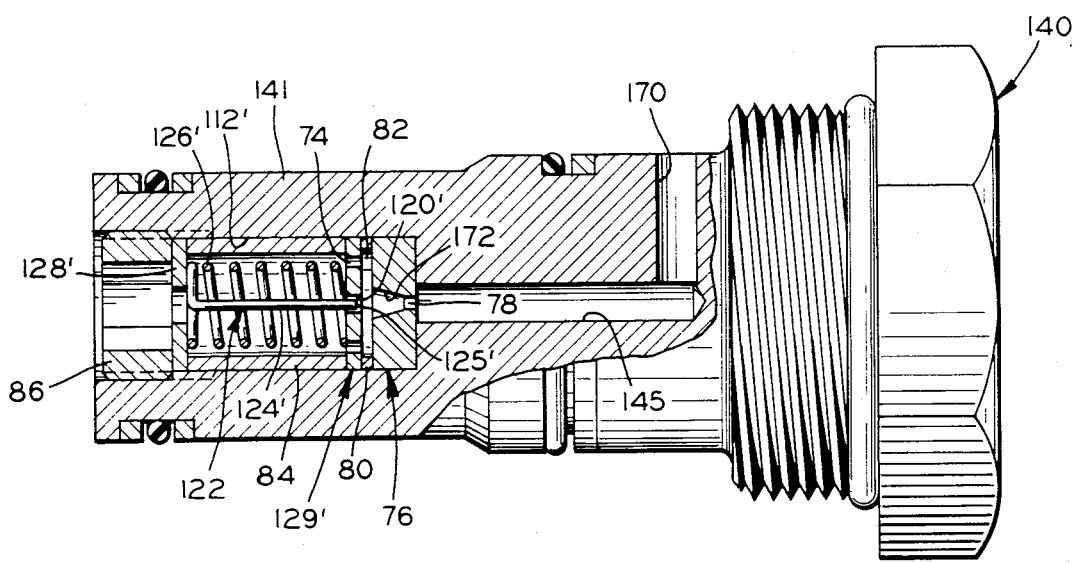
FIG. 6 is a partial cross-sectional view of a cartridge employing a further embodiment of the present invention.

A further modification is shown in FIG. 6. This design shows a positive means for preventing fiber of lint type contaminants from adhering to the metering end of the restrictor. This arrangement is shown incorporated in a cartridge 140 similar to that illustrated in FIG. 3. A central passage 112' is provided in stem portion 141 of cartridge 140. Passage 112' comprises an outer cylindrical bore 143 and an inner reduced diameter bore 145. A restrictor 122' is located in fluid passage 112' to meter and control fluid flow through passage 112'. The coiled portion of spring 126 is resiliently positioned in fluid passage 112' by axially spaced abutments in the form of washers 128' and 129'. Washer 128' has an enlarged diameter central passage while washer 129' has a reduced diameter central orifice 120' and a plurality of radially spaced through passages 74. Located at the base of outer cylindrical bore 143 is a ring 76 having an enlarged diameter tapered hole 172 blending into a smaller diameter hole 78. Cooperating holes 172 and 78 are axially aligned with reduced diameter orifice 120' of washer 129. Washer 129 is spaced from ring 76 by a spacer 80 to form a chamber 82 therebetween for communicating with washer passages 74. In this embodiment, a cylindrical sleeve 84 surrounds the coils of spring 126' and has its opposite ends engaging washers 128' and 129' to hold them in axially spaced relation. A nut 86 is threaded in the outer end of passage 112 and seated against washer 128' to retain the components in assembled relation. A central opening is provided in nut 86 for receiving a suitable tool to fasten it in place and also serve as a flow passage for fluid.

In the assembled position, spring 126' is preloaded between washers 128' and 129' and metering end 125' of wire 124' extends into reduced diameter orifice 120'. Preferably, with restrictor 122' at rest or with a minimal pressure differential, end 125' is positioned so that it is located slightly inward of reduced diameter orifice 120', i.e., does not project entirely through orifice 120'.

In operation, as the system differential increases, flow caused by this differential through passages 74 and reduced diameter orifice 120' in washer 129' creates a pressure differential on wire 124'. This differential acts on the cross sectional area of wire 124' to compress spring 126' thereby moving metering end 125' into tapered hole 172 of ring 76. Under low pressure differential, spring 126' expands causing wire 124' to retract end 125' from tapered hole 172 toward reduced diameter orifice 120'. As this occurs, any contaminants that may be wrapped around wire end 125' will be dislodged by the inner wall of washer 129' as end 125' is pulled back into reduced diameter orifice 120'. The dislodged contaminants will be flushed freely through the cooperating holes 172 and 78 in bushing.

Other types of resilient means may be used in place of the coil spring as well as other types of retaining means to secure the resilient means in the flow passage.

Also, as indicated earlier, the resilient means may be varied to produce different preloads on the spring as desired, as e.g. additions of coils or increasing the wire diameter.

From the foregoing description it is apparent that the advantages of the present invention result from the combined relationship of the resilient means and metering device. The arrangement is such as to provide an automatic flow regulator that may be used in a flow passage of numerous types of hydraulic systems to achieve the simultaneous result of metering a predetermined flow of fluid through an orifice and preventing contaminents from obstructing the flow through the restricted orifice. In addition, combining the resilient means and metering device in the manner disclosed results in a simple compact arrangement which eliminates the need for complex devices of the type now required to achieve the desired results.

Having thus described preferred embodiments of the present invention, it should be understood that the invention is not to be limited to the specific construction and arrangement shown. It will be apparent to those skilled in the art that modifications or alterations may be made without departing from the spirit and scope of the invention as set forth in the claims.

What is claimed is:

1. In a fluid system comprising:
   (a) a fluid passageway having opposite ends constantly open for flow of fluid therethrough,
   (b) a restriction in said passageway, said restriction comprising an orifice and a wire extendable into said orifice, said wire having two axially spaced end portions,
   (c) resilient means for axially biasing said wire relative to said orifice, an improvement wherein said wire has a constant diameter throughout, one of said wire end portions is exposed to fluid on one side of said orifice and another of said end portions is exposed to fluid on the other side of said orifice, whereby said wire is axially movable against the force of said resilient means when the pressure force differential applied to the wire by fluid acting on the ends of the wire exceeds the biasing force.

2. The fluid system of claim 1 wherein said wire is of sufficient length to extend completely through said orifice under all operating conditions.

3. A fluid system according to claim 1 further comprising a tapered opening cooperating with said orifice and said wire projecting into said tapered opening.

4. A fluid system comprising first and second pressure chambers connected by a passage having opposite ends constantly open for flow of fluid therethrough, said passage having a reduced diameter orifice and a tapered opening adjacent one of said pressure chambers, a metering wire movable into said reduced diameter orifice, said metering wire having a constant diameter throughout and fluid engaging surfaces exposed to fluid in at least one of said pressure chambers, resilient means biasing said metering wire in a first direction, and said fluid engaging surfaces being responsive to differential pressures in said pressure chambers to reciprocate said metering wire relative to said reduced diameter orifice.

5. An improved fluid pressure system according to claim 4 further comprising resilient means in said fluid passage biasing said wire in a first direction.

6. An improved fluid pressure system according to claim 1 or 5 wherein said resilient means comprises a coiled compression spring connected to said wire.

7. An improved fluid pressure system according to claim 6 wherein said wire extends through the coils of said spring and is integral with said spring coils.

8. A fluid system comprising spaced first and second pressure chambers, a constantly open passage having one end connected to said first pressure chamber, said passage having a reduced diameter orifice connecting the opposite end to said second pressure chamber, a metering wire extendable into said reduced diameter orifice, said metering wire having a constant diameter throughout and fluid engaging surfaces exposed to fluid in at least one of said pressure chambers, a resilient means biasing said metering wire in a first direction, and said fluid engaging surfaces being responsive to differential pressures in said pressure chambers to reciprocate said metering wire in said reduced diameter orifice.

9. A fluid system according to claims 4 or 8 wherein said resilient means comprises a coiled compression spring having spaced ends, and wherein said wire is connected to one of said spring ends and extends through said spring coils.

10. A fluid system according to claim 9 wherein said passage further comprises a pair of spaced abutments for seating engagement by said spring ends.

11. A fluid system according to claim 10 wherein one of said abutments comprises an integral shoulder formed at one end of said passage and said other abutment comprises a washer secured at the other end of said passage.

12. A fluid system according to claim 10 wherein said reduced diameter orifice is formed in one of said abutments.

13. A fluid system according to claim 10 wherein said reduced diameter orifice and said tapered opening are formed in one of said abutments.

14. A fluid system according to claim 10 wherein said abutments comprise a pair of axially spaced washers at opposite ends of said passage.

15. A fluid system according to claim 14 wherein a ring is located in said passage, in spaced relation to one of said washers, said reduced diameter orifice is formed in said one washer, said tapered opening formed in said ring.

* * * * *